US012755918B2

(12) United States Patent
Domejean et al.

(10) Patent No.: US 12,755,918 B2
(45) Date of Patent: Oct. 6, 2026

(54) ELECTRICAL PROTECTION DEVICES COMPRISING AN INTEGRATED SWITCHING MODULE

(71) Applicant: Schneider Electric Industries SAS, Rueil-Malmaison (FR)

(72) Inventors: Eric Domejean, Voreppe (FR); Jérôme Brenguier, L'Albenc (FR); Frédéric Court, Saint Nicolas de Macherin (FR); Christophe Kilindjian, St Nazaire les Eymes (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 172 days.

(21) Appl. No.: 18/290,368

(22) PCT Filed: May 19, 2022

(86) PCT No.: PCT/EP2022/063617
§ 371 (c)(1),
(2) Date: Nov. 13, 2023

(87) PCT Pub. No.: WO2022/243456
PCT Pub. Date: Nov. 24, 2022

(65) Prior Publication Data

US 2024/0258057 A1 Aug. 1, 2024

(30) Foreign Application Priority Data

May 20, 2021 (FR) ....................................... 2105289

(51) Int. Cl.
*H01H 71/12* (2006.01)
*H01H 9/52* (2006.01)
(Continued)

(52) U.S. Cl.
CPC ............ *H01H 71/123* (2013.01); *H01H 9/52* (2013.01); *H01H 9/548* (2013.01);
(Continued)

(58) Field of Classification Search
CPC ................. H05K 1/0306; H05K 1/181; H05K 2201/10053; H05K 2201/10166;
(Continued)

(56) References Cited

U.S. PATENT DOCUMENTS 4,999,464 A * 3/1991 Bellino .................. H01H 1/023 200/275
9,634,661 B1 * 4/2017 Chen .................... H03K 17/969
(Continued)

FOREIGN PATENT DOCUMENTS

| | | | |
|---|---|---|---|
| EP | 2234136 | A1 | 9/2010 |
| WO | 2019096692 | A1 | 5/2019 |
| WO | 2021043497 | A1 | 3/2021 |

OTHER PUBLICATIONS

International Search Report and Written Opinion dated Sep. 22, 2022 for corresponding International Application No. PCT/EP2022/063617, 12 pages.

*Primary Examiner* — Anthony R Jimenez
(74) *Attorney, Agent, or Firm* — Wolf, Greenfield & Sacks, P.C.

(57) ABSTRACT

An electrical protection system has a housing, connecting terminals, separable electrical contacts, a switching mechanism and at least one power switch connected in series with the separable electrical contacts. The system further includes an electronic control circuit coupled to the at least one power switch, the or each power switch has a metallic heat dissipation plate connected to an electrode of the power switch, the heat dissipation plate being thermally connected to the body of the power switch. The or each power switch is connected in series with the separable electrical contacts
(Continued)

between the connecting terminals via a conductive plate connected to the heat dissipation plate of the respective power switch.

19 Claims, 11 Drawing Sheets

(51) Int. Cl.
*H01H 9/54* (2006.01)
*H01H 33/59* (2006.01)
*H01H 71/04* (2006.01)

(52) U.S. Cl.
CPC ..... *H01H 33/596* (2013.01); *H01H 2071/048* (2013.01); *H01H 2071/124* (2013.01)

(58) Field of Classification Search
CPC ............. H02H 7/222; H01H 2009/543; H01H 2009/544; H01H 89/00; H01H 9/02; H01H 9/542; H01H 9/548; H01H 9/52; H01H 33/596; H01H 2071/048; H01H 2071/124; H01H 71/123; H01L 23/053
USPC ....................................................... 200/50.32
See application file for complete search history.

(56) References Cited

U.S. PATENT DOCUMENTS

| | | | | |
|---|---|---|---|---|
| 11,948,768 | B2 * | 4/2024 | Askan .................. | H05K 1/0306 |
| 2020/0357582 | A1 | 11/2020 | Askan | |
| 2022/0293354 | A1 * | 9/2022 | Askan ...................... | H01H 1/62 |

* cited by examiner

ELECTRICAL PROTECTION DEVICES COMPRISING AN INTEGRATED SWITCHING MODULE

CROSS-REFERENCE TO RELATED APPLICATIONS

This application is a 35 U.S.C. § 371 National Phase filing of International Application No. PCT/EP2022/063617, filed on May 19, 2022, which claims priority to and the benefit of French Application No. 2105289, filed on May 20, 2021.

TECHNICAL FIELD

The present invention relates to the technical field of electrical protection devices and systems, such as circuit breakers.

PRIOR ART

Many electrical switching devices of electromechanical type, such as air circuit breakers, and notably miniature circuit breakers (MCBs) generally comprise a quenching chamber. The quenching chamber is configured to extinguish an electric arc which occurs in the air between the electrical contacts of the device when the electrical contacts are separated after the device is tripped.

The quenching chamber typically comprises a stack of metal plates which are superposed on one another in order to stretch and extinguish the electric arc. One or more orifices made in the housing make it possible to discharge the quenching gases from the device.

However, in order to improve the performance of these protection devices, a proposal has been made to replace the quenching chamber with an electronic breaking device comprising power switches based on semiconductor components.

Such improved performance is, for example, advantageous in direct-current (DC) electrical systems comprising batteries of electrochemical accumulators, the electrical protection devices for which must be capable, in the event of the occurrence of an electrical fault, of interrupting strong currents with a very rapid reaction time.

For the sake of compatibility with existing installations, it is desirable for these protection devices to be able to be contained in a housing having the same size as the housings of switching devices of electromechanical type.

It is also necessary for these devices to be capable of correctly removing the heat released by the power switches.

There is therefore a need for electrical protection devices, such as circuit breakers, based on semiconductor components, which at least partially remedy these drawbacks.

SUMMARY OF THE INVENTION

To this end, one aspect of the invention relates to an electrical protection system, comprising a housing, connection terminals, separable electrical contacts connected between the connection terminals, a switching mechanism and at least one power switch which is connected in series with the separable electrical contacts, the separable electrical contacts being able to move between an open state and a closed state, the switching mechanism being coupled with the separable electrical contacts in order to switch the separable electrical contacts to the open state, the electrical protection system further comprising an electronic control circuit coupled with said at least one power switch, the or each power switch comprising a heat dissipation plate made of metal connected to an electrode of said power switch, said heat dissipation plate being thermally connected to the body of said power switch, and wherein the or each power switch is connected in series with the separable electrical contacts between the connection terminals via a conductive plate connected to the heat dissipation plate of said respective power switch.

By virtue of the invention, the space freed up by the absence of the components removed from a conventional miniature circuit breaker (these elements generally comprising a bimetal strip, a magnetic trip, a magnetic shield, a gas-generating cheek and the stack of metal plates of the quenching chamber) is utilized to house the breaking block comprising the power switches between at least one (preferably several) conductive plates and the walls of the housing of the device. Another advantage is that, the more thermal energy the plates dissipate, the fewer semiconductor breaking components are required.

According to advantageous but non-mandatory aspects, such an electrical protection device may incorporate one or more of the following features, taken alone or in any technically permissible combination:

- the or each power switch associated with a pole of the device is mounted on a plate-shaped substrate integrated into a block, the respective conductive plate of each power switch being mounted on the same side of the substrate of the block;
- the system comprises two groups of at least one power switch which are associated with the same pole of the system which are mounted on the substrate, each at least one power switch and the respective conductive plate of said group being mounted on the opposite sides of the substrate;
- the or each block is accommodated in a dedicated compartment of the housing;
- the or each conductive plate covers at least 40% of the surface area of the corresponding face of the side wall of the housing;
- the or each conductive plate extends parallel to the widest walls of the housing;
- the heat dissipation plate is a metal plate natively fastened to a ceramic body of the power switch;
- said at least one power switch is a field-effect transistor, preferably a MOSFET;
- the or each conductive plate is made of metal;
- the or each metal plate is made mainly of copper or of aluminum;
- one of the conductive plates comprises a segment which is suitable for forming an electrical contact, the segment being used as a fixed electrical contact which interacts with a mobile contact of the system to together form said separable electrical contacts;
- the or each conductive plate is connected to a respective connection terminal of the system.

According to another aspect, the electrical protection device is a miniature circuit breaker, the width of the housing is comprised a multiple of 9 mm and the electrical protection device is an air circuit breaker.

BRIEF DESCRIPTION OF THE FIGURES

The invention will be better understood and other advantages thereof will become more clearly apparent in light of the following description of one embodiment of an electrical protection system, which description is given merely by way of example and with reference to the appended drawings, in which.

DETAILED DESCRIPTION OF CERTAIN EMBODIMENTS

Figure 1:
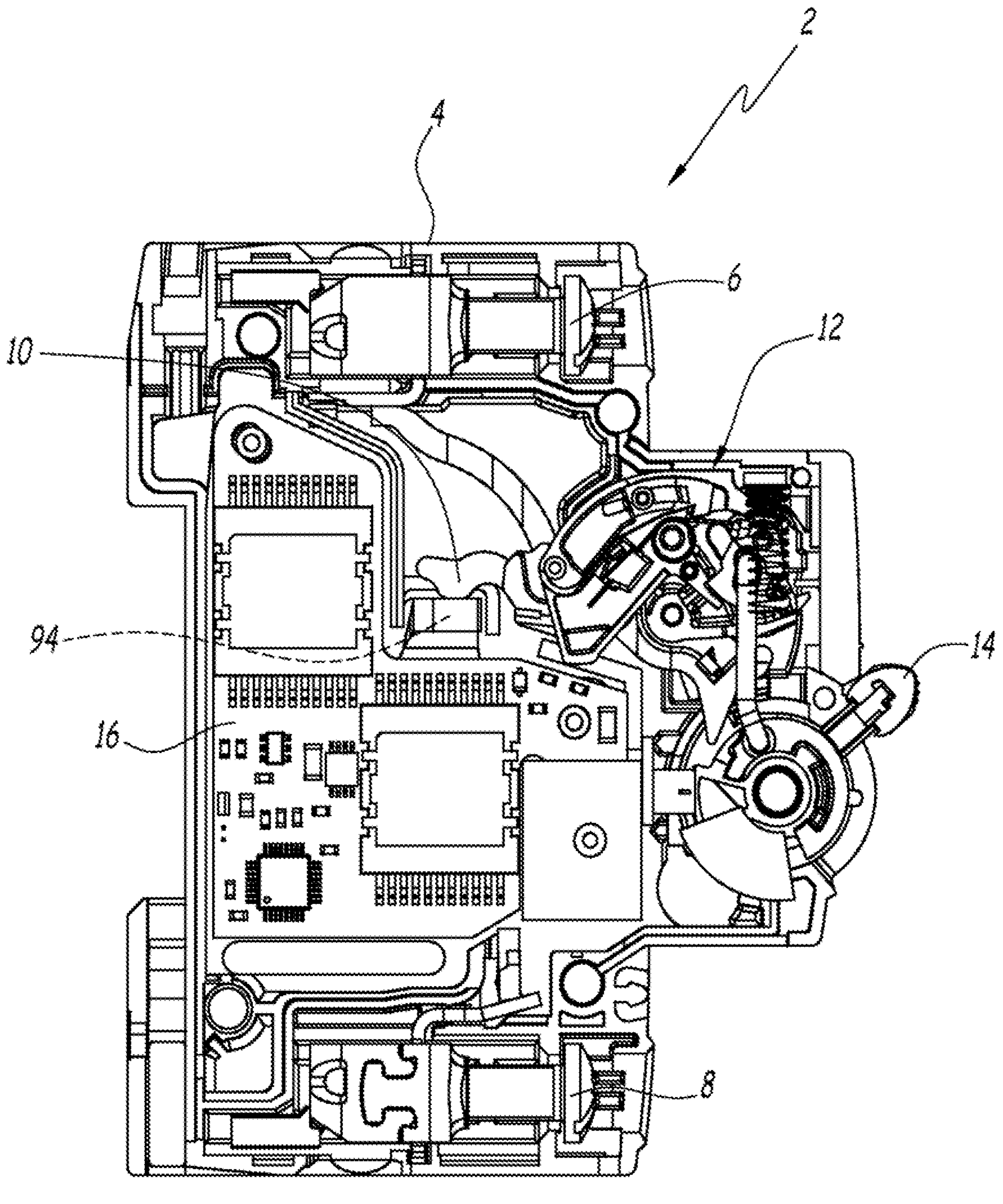
FIG. 1 is a schematic representation, seen in cross section, of an electrical protection device according to some embodiments of the invention.
Figure 2:
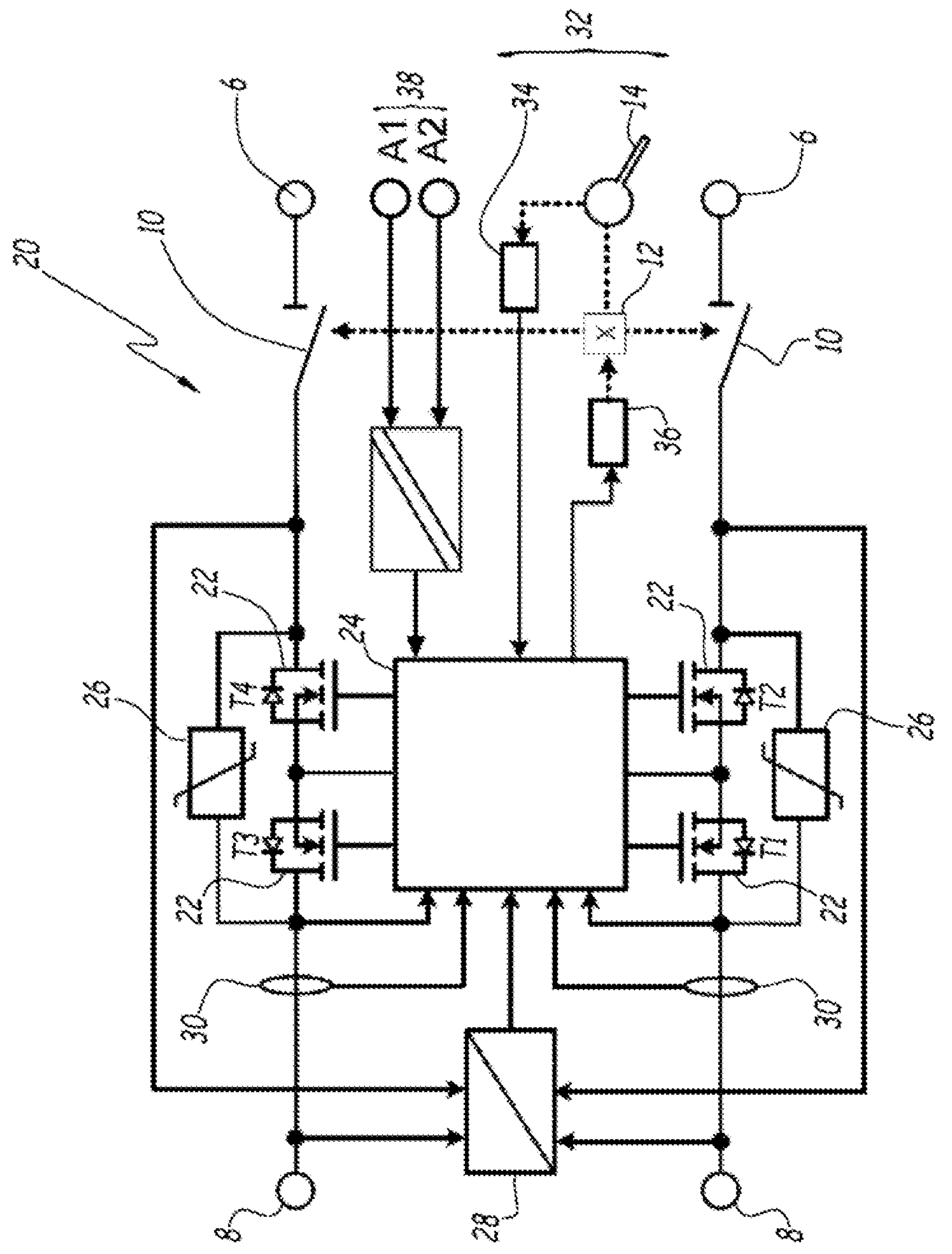
FIG. 2 is a functional diagram of the electrical protection device of FIG. 1, in the case of a two-pole device.

FIGS. 1 and 2 schematically show an electrical protection device 2 according to some embodiments of the invention.

In many embodiments, the electrical protection device 2 is a circuit breaker.

Preferably, the device 2 is a miniature circuit breaker.

The device 2 comprises a housing 4 inside which at least some of the components of the device 2 are housed.

The housing 4 is preferably manufactured from a rigid and electrically insulating material, such as a thermoformed polymer, for example polyamide PA 6.6, or any other suitable material.

For example, the housing 4 is a housing made of molded plastic.

Preferably, the dimensions of the housing 4, and notably the width of the housing or the aspect ratio of the housing 4, are compatible with the dimensions of the housings 4 of existing protection devices.

In one non-limiting example of implementation given by way of illustration, the width of the housing is preferably a multiple of 9 mm, for example equal to 9 mm, or to 18 mm, or to 27 mm.

It is understood that, in this example, the components of the electrical protection system are housed in the same housing 4. However, in certain variants, certain components could be housed in different housings. What is here described with reference to the device 2 can therefore be generalized to an electrical protection system 2 which can be dissociated from the housing 4.

The device 2 also comprises connection terminals 6 and 8, separable electrical contacts 10 connected between the connection terminals 6 and 8 and a switching mechanism 12 comprising a control member 14 (also called a control stick or control lever below). The control lever 14 is, for example, a pivoting lever which can be accessed from outside the housing 4 and intended to be manipulated by a user.

For example, the contacts 10 may be formed by associating a fixed electrical contact and a mobile electrical contact which can move with respect to the fixed contact, the switching mechanism 12 being coupled to the mobile mechanical contact.

In practice, each electrical contact 10 may comprise a plurality of electrical contact fingers, although other implementations are possible as variants.

The separable electrical contacts are able to move between an open state and a closed state. In the open state, the contacts 10 are separated from one another by a volume of ambient air acting as an electrical insulator, this preventing an electric current from flowing.

In the example of FIG. 2, the device 2 comprises two pairs of connection terminals 6, 8: a first input terminal 6 connected to a first output terminal 8 via a first connection line, and a second input terminal 6 connected to a second output terminal 8 via a second connection line.

This example, which is given for the purposes of illustration, corresponds to the case of a two-pole device (with two electrical poles, or two electrical phases). Other examples are, however, possible.

In many embodiments, the switching mechanism 12 is configured to move the electrical contacts 10 to an open state in response to a switching command. The switching command may be sent by a trip or result from an action of a user on the control lever 14.

For example, the switching mechanism 12 is a toggle mechanism, such as a switching mechanism which is analogous or similar to the switching mechanism described in patents EP 2975628 B1 or EP 1542253 B1.

The device 2 also comprises an electronic breaking module 16 which is configured to interrupt an electric current between the connection terminals 6 and 8. The electronic breaking module 16 is here based on solid-state breaking components, notably semiconductor components, such as power transistors. In this, the device 2 differs from electromechanical air protection devices which comprise a quenching chamber (arc-extinguishing chamber).

Preferably, the electronic breaking module 16 is accommodated in a dedicated compartment of the housing 4. Even more preferably, when the housing 4 is of the same type as (or even identical to) the housings of electromechanical protection devices, said compartment corresponds to the space normally occupied by the quenching chamber as well as by means for detecting an electrical fault (of the type referred to as thermomagnetic), such as a bimetal strip and a coil.

This makes it possible to retain the architecture of existing circuit breakers and to ensure compatibility with existing installations.

The device 2 thus comprises at least one power switch 22 connected in series with the separable electrical contacts 10.

In the illustrated example, which corresponds to the illustrative case of a two-pole device, the device 2 comprises four power switches 22, identified here by the reference signs T1, T2, T3 and T4.

For example, the first connection line comprises two power switches T1 and T2 connected in series with the separable contact between the first terminals 6 and 8. Likewise, the second connection line comprises two power switches T3 and T4 connected in series with the second separable contact 10 between the second terminals 6 and 8. For example, each of said first and second connection lines corresponds to one electrical phase.

In practice, the number of power switches may differ, according to the topology of the device and notably the number of poles (single-phase, polyphase, with or without a neutral line) but also depending on the current rating of the device.

Each power switch may, in practice, be implemented by several components (such as transistors) connected in parallel depending on the rating of the circuit breaker which there is a desire to produce.

For example, in the device 2, which illustratively and entirely non-limitingly has a rating of sixteen amperes, two pairs of transistors connected in series are used, the transistors of each pair of transistors being connected in parallel. In a variant having a higher rating, for example thirty-two amperes, it is possible to use a larger number of transistors which are connected in parallel.

Each power switch 22 can be switched between an electrically off state and an electronically on state.

For example, the power switches 22 are power transistors.

According to one preferred embodiment, the power switches 22 are MOSFETs (metal-oxide-semiconductor field-effect transistors).

This type of transistor is preferred because it has a low on-state resistance, but also because it remains in the off state when it is at rest (for example when no control signal is sent to the control electrode).

Other semiconductor technologies may, however, be envisaged in accordance with the rating of the circuit breaker, such as insulated-gate bipolar transistors (IGBTs), or thyristors, or integrated gate-commutated thyristors (IGCTs), or indeed yet other technologies.

As a variant, the power switches 22 may be JFETs (junction field-effect transistors). In this case, the operation of the control circuit 24 may have to be modified, to take account of the fact that such JFETs are in the on state when they are at rest.

In practice, a diode is present in parallel with each of the power switches 22, as illustrated in FIG. 2, although other embodiments are possible as variants. Generally, this is a parasitic diode which is inherent to the construction of the power switch.

The electrical protection device further comprises an electronic control circuit 24 coupled with said at least one power switch 22 (i.e., with each power switch 22). In other words, the electronic control circuit 24 makes it possible to control each of the power switches 22.

In many embodiments, the electronic control circuit 24 comprises a processor, such as a programmable microcontroller or a microprocessor.

The processor is advantageously coupled to a computer memory, or to any computer-readable data storage medium, which contains executable instructions and/or software code which is intended to implement a method for detecting an electrical fault when these instructions are executed by the processor.

Notably, this method makes it possible to detect an electrical fault such as an overload current, a short circuit, a differential current or the presence of a series (or differential) arc in the line to be protected, but also overvoltages or undervoltages.

According to variants which are not described in detail, the electronic control circuit 24 may comprise a digital signal processor (DSP), or a field-programmable gate array (FPGA), or an application-specific integrated circuit (ASIC), or any equivalent element, or any combination of these elements.

Advantageously, the device 2 may comprise one or more elements 26 for protecting against overvoltages, which elements are connected in parallel with the one or more power switches 22, in order to protect the power switches 22 against overvoltages, notably in the event of the occurrence of an electric arc when the contacts 10 are separated.

This notably makes it possible to protect the switches from voltages during breaking in cases where the installation comprises inductive circuits.

For example, the protection elements 26 are clippers or metal-oxide varistors (MOVs) or transil (TVS, or "transient-voltage-suppression") diodes.

In many embodiments, the device 2 comprises an internal electrical power supply 28 configured to electrically power the electrical control circuit, preferably using the electric current which flows between the connection terminals 6, 8 when the device 2 is in operation.

As a variant, the internal electrical power supply 28 may comprise a battery, or any other means making an autonomous electrical power supply possible.

For example, the electronic control circuit 24 is configured to switch the power switches 22 to an open state when an electrical fault is detected by a measuring circuit 30. For example, the device 2 comprises current sensors 30, which are here coupled to each connection line.

For example, the electrical faults may be overcurrents or short circuits, but also other electrical faults such as a differential current or the presence of a series (or differential) arc in the line to be protected, or even also overvoltages or undervoltages.

When tripped (i.e., after an electrical fault requiring immediate interruption of electric current is detected), the device 2 may be switched through the combined action of the switching mechanism 12 and the power switches 22.

Furthermore, according to some embodiments, the device 2 also comprises a synchronizing system 32 intended to synchronize switching of the power switches 22 with opening of the contacts 10, with the aim of avoiding the occurrence of electric arcs when the electrical contacts 10 are opened.

To this end, the device 2 comprises a sensor 34 configured to measure a position of the switching mechanism 12. Preferably, the sensor is configured to measure the position of the control lever 14 of the switching mechanism 12, or of a part secured to the control lever 14.

For example, the sensor 34 is connected to an input of the electronic control circuit 24 so as to send a measurement signal. The sensor 34 may be placed facing a part of the switching mechanism 12 (for example, facing the mechanical part bearing the control lever 14). In other words, the sensor 34 may be coupled to the control lever 14.

According to one non-limiting example of implementation given by way of illustration, the sensor 34 may be configured to emit a binary signal, taking a first value when the switching mechanism 12 is in a position in which the electrical contacts 10 are closed, and taking a second value (which is different from the first value) when the switching mechanism is in a position preceding the position from which the electrical contacts 10 begin to separate (as the opening movement of the lever continues).

For example, this position may correspond to a specific angular position threshold for the control lever 14.

By way of illustration, the position threshold may correspond to an angle of 20° with respect to the original position of the control lever 14. As a variant, another angle may be chosen. In practice, the angle is preferably smaller than or equal to 20°, or smaller than or equal to 10°, or smaller than or equal to 5°.

Preferably, the sensor 34 is an optical sensor.

According to some embodiments, the sensor 34 is an obstruction-based optical sensor, for example arranged such that the light signal received by a sensitive element of the sensor 34 is obstructed when the control lever 14 reaches a certain position, for example when the control lever 14 has begun to move with respect to the closed position.

As a variant, the sensor 34 may take a different form and may thus be a mechanical sensor, or an inductive sensor with external-field compensation.

In many embodiments, the sensor 34 is housed in the same housing as the switching mechanism 12 and the control member 14. However, as a variant, the sensor 34 may be housed in a first housing and the control member 14, as well as at least one portion of the switching mechanism 12, are housed in another housing.

In particular, for devices comprising several poles (for example, for a three-phase circuit breaker or a two-pole DC circuit breaker), the control members (control levers) of each pole are mechanically interconnected. In this system, it may be advantageous to employ a single sensor for the whole protection device, rather than using one sensor for each pole. This single sensor may then be located remotely in another housing.

As will be explained in more detail with reference to FIGS. 2 to 6, the electronic control circuit 24 is configured to switch the one or more power switches 22 to the off state when the sensor 34 detects that the switching mechanism is moving to the open position, and more particularly before the electrical contacts 10 separate.

In optional but nevertheless advantageous embodiments, the device 2 may comprise an auxiliary sensor (which is not illustrated), configured to measure a position of the switching mechanism, the auxiliary sensor being configured to operate in conjunction with the optical sensor 34. This arrangement is particularly applicable to large circuit breakers, in order to improve the reliability of the detection of the position of the switching mechanism 12. This auxiliary sensor may, however, be omitted.

Optionally, the synchronizing device 32 may comprise an actuator 36 configured to set the switching mechanism 12 in motion. The actuator 36 comprises, for example, an electric motor, or an electromagnetic actuator comprising a mobile mechanical portion which can move under the action of an electromagnetic actuator. For example, the actuator 36 is controlled by the electronic control circuit 24 and may thus control the opening of the electrical contacts 10 via the mechanism 12.

In optional embodiments, an external trip which is outside the electronic control circuit 24 may be connected to an input of the electronic control circuit 24 in order to transmit a trip command and thus cause the device 2 to trip via the electronic control circuit 24.

The trip command emitted by the external trip may be transmitted electronically, via a wired link or via a radio-frequency signal.

In other embodiments, the external trip may be mechanically coupled to the switching mechanism 12 or to the electronic control circuit 12 (for example, via an electromechanical sensor).

In certain implementations, an auxiliary electrical power supply 38 may be used to electrically power the electronic control circuit 24.

For example, an auxiliary electrical power supply 38 which is outside the device 2 is connected to terminals A1, A2 of the device 2, said terminals being connected to an electrical distribution circuit (such as a power supply rail).

One example of operation of the switching mechanism 12 and of the synchronizing system 32 is now described with reference to FIGS. 3 to 5.

Figure 3:
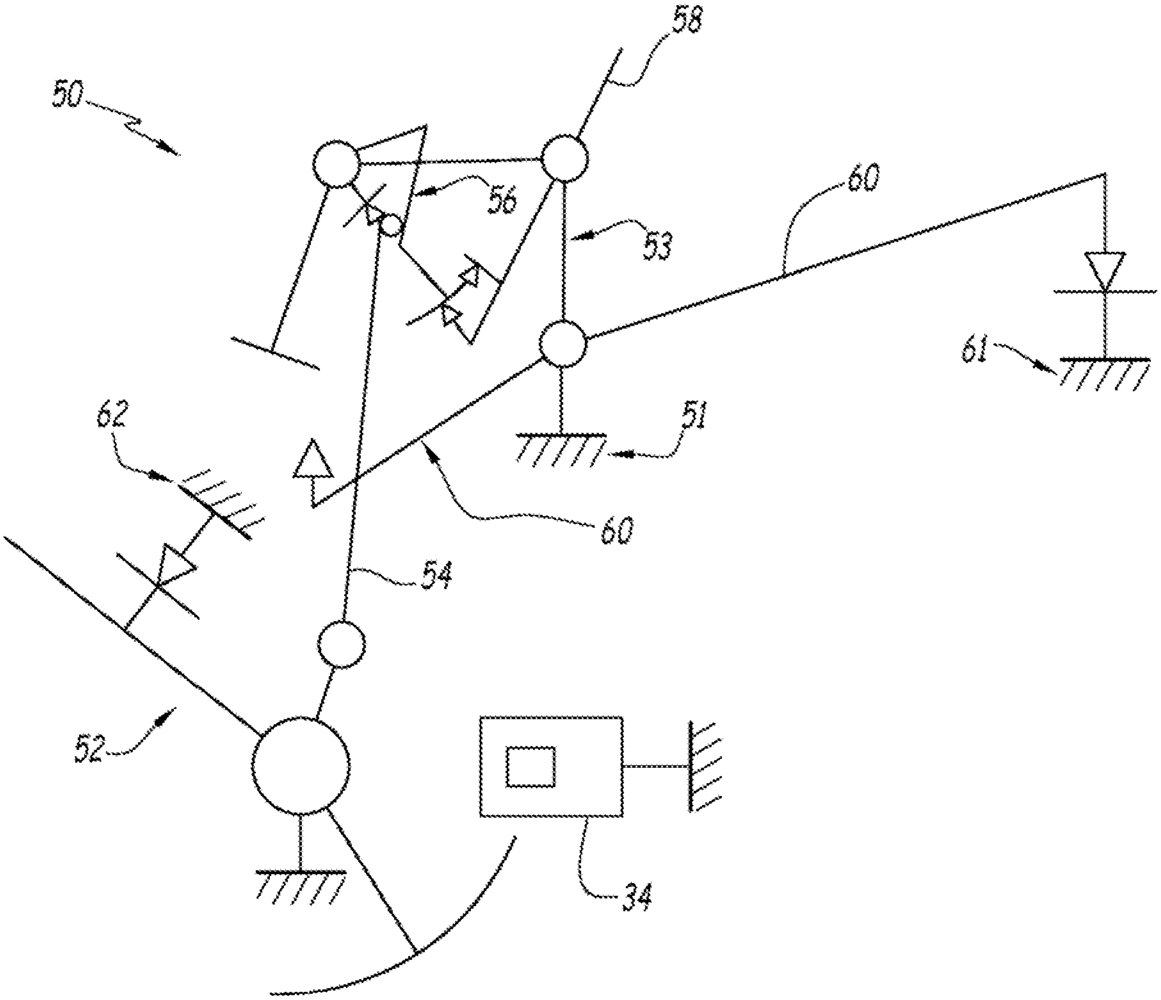
FIG. 3 is a schematic representation of a first step of a sequence of movements of a switching mechanism of the electrical protection device of FIG. 1 when the device is switched to an open state.
Figure 4:
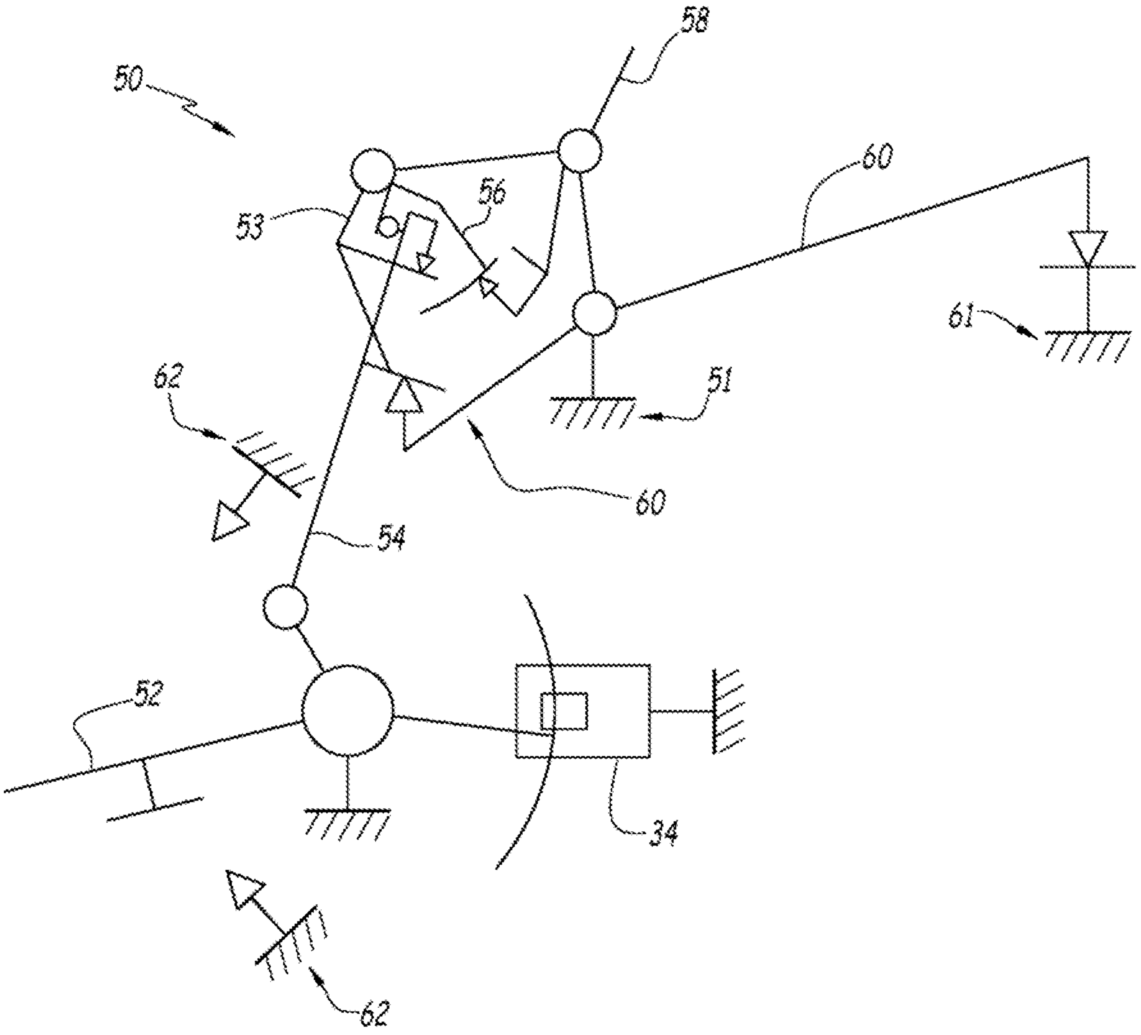
FIG. 4 is a schematic representation of a second step of a sequence of movements of a switching mechanism of the electrical protection device of FIG. 1 when the device is switched to an open state.
Figure 5:
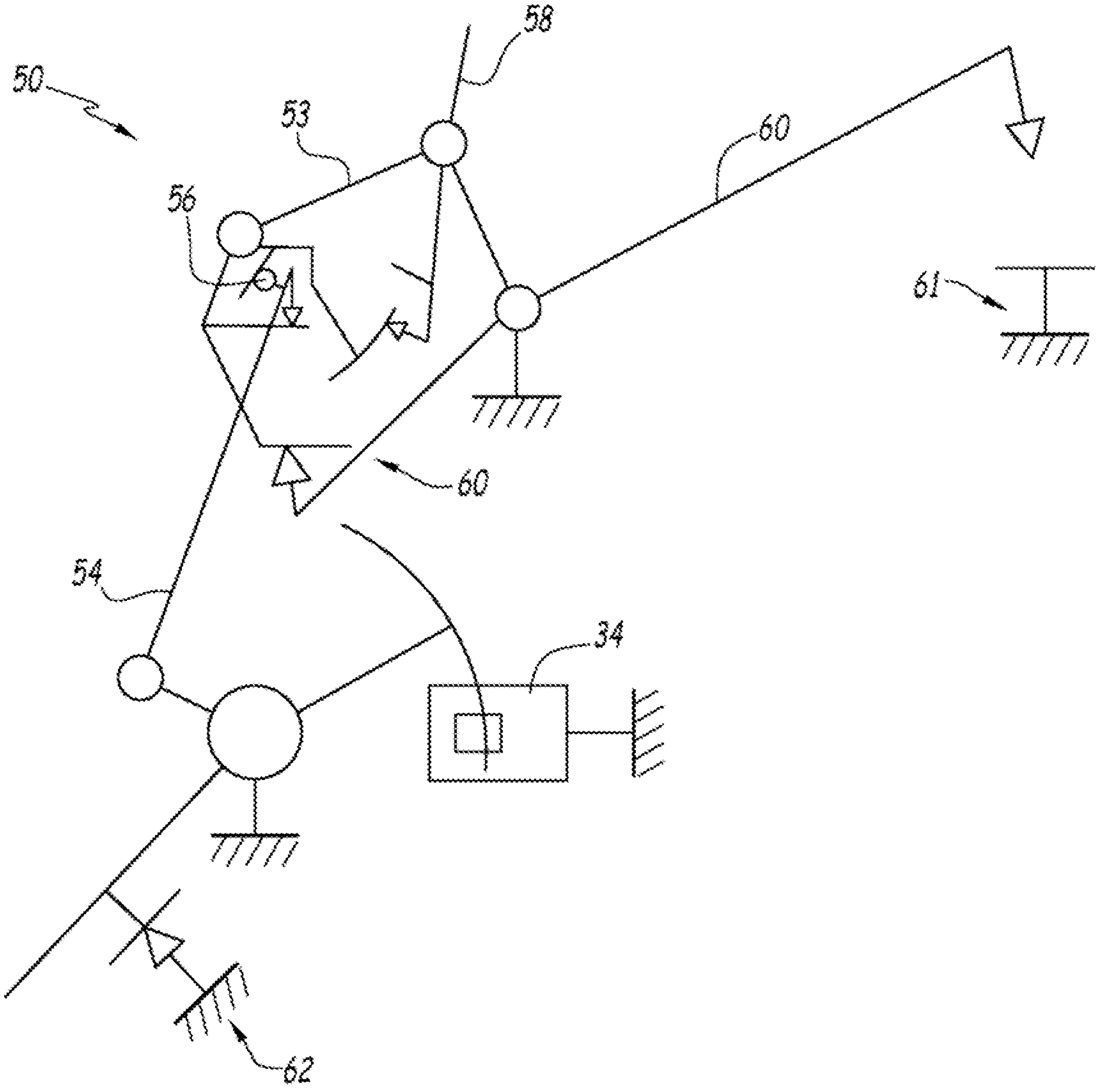
FIG. 5 is a schematic representation of a third step of a sequence of movements of a switching mechanism of the electrical protection device of FIG. 1 when the device is switched to an open state.

FIGS. 3, 4 and 5 schematically show a simplified version 50 of the switching mechanism 12 in various successive configurations over time. More specifically, FIG. 3 corresponds to the closed state of the switching mechanism 12, in which the electrical contacts 10 are in contact (in the closed state) and make it possible for a current to flow. FIG. 5 corresponds to an open state of the switching mechanism 12, in which the electrical contacts 10 are separated from one another. FIG. 4 corresponds to an intermediate state during a transition from the closed state to the open state.

As illustrated in FIG. 3, the switching mechanism 12 comprises:

- the control lever 14, which takes the form of a rotary part 52 mounted so as to be able to rotate about a rotation axle secured to the housing 4 (the hatched zones which may be seen in FIG. 3, one of which bears the reference sign 51, represent anchoring points which are immobile with respect to the housing 4);
- a transmission rod 54, or link rod;
- a trip hook 56, which is rotatably mounted and coupled to the part 52 via the transmission rod 54;
- a deck 53 mounted so as to be able to rotate about a rotation axle secured to the housing 4 and coupled to the hook 56;
- a trip bar 58, which is coupled to the deck 53 and to the hook 56;
- a contact holder 60 which bears the mobile electrical contact 10 and which interacts with the fixed electrical contact 61, the contact holder being mounted so as to be able to rotate about a rotation axle secured to the housing 4;
- stops 62 which limit the rotational movement of the control lever 52, for example in the open and closed positions, respectively.

The rotation axles are here arranged parallel, for example all being arranged perpendicular to a side wall of the housing 4.

During the trip phase, the trip bar 58 is driven to rotate, this releasing the hook 56 and driving rotation of the deck 53 and of the contact holder 60 to the open position. In parallel, the movement of the deck triggers a rotational movement of the part 52 via the transmission rod 54.

In the illustrated example, the sensor 34 is arranged in such a way that, in the open state, at least one portion of the part 52 is placed in front of the sensor 34, so as, for example, to mask at least a sensitive portion of the sensor 34. In contrast, in the closed state, the part 52 remains distant from the sensor 34 and does not mask the sensitive portion of the sensor 34. The position from which the sensitive portion of the sensor 34 is masked by the part 52 can correspond to an angular position threshold. When the part 52 passes in front of the sensor, the sensor 34 changes state and then sends a different measurement signal.

Figure 6:
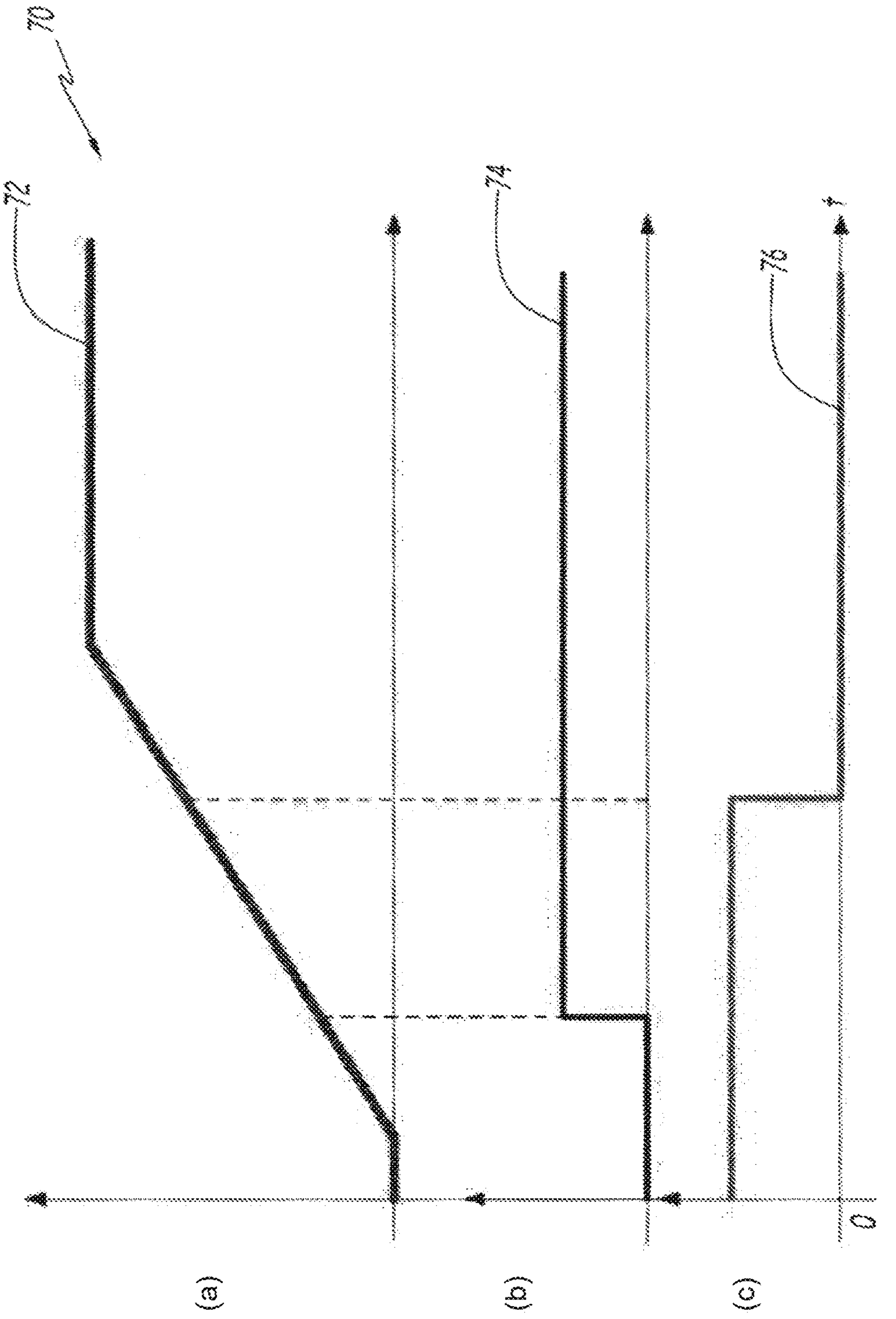
FIG. 6 is a graph showing the variation over time in the angular position of a control stick associated with the switching mechanism of FIGS. 3 to 5 when the device is switched to an open state.

With the configuration employed in the illustrated example, the angular position threshold is reached at the latest just before the electrical contacts 10 begin to separate, as illustrated in FIG. 4 and in FIG. 6.

In FIG. 6, the timing diagram 70 shows the variation, as a function of time (labeled "t", on the x-axis):

- in the position of the switching mechanism 12, shown here by the angular position of the control lever 14 (the curve 72),
- in the state of the optical sensor 34 (the curve 74, which may here take either a low value or a high value, according to whether the measurement signal takes the first value or the second value, respectively);
- in the closed or open state of the separable electrical contacts 10 (the curve 76, which may here take either a low value or a high value, corresponding to the open state and to the closed state, respectively).

Thus, following tripping, the angle of the control lever 14 until it reaches a threshold (represented here by the first vertical dashed line on the curve 74) at which the sensor changes state. In response, the electrical control circuit 24 triggers switching of the power switches 22 to their off state, in order to interrupt the flow of current. After a certain delay, here immediately after the position which may be seen in FIG. 4, the electrical contacts 10 are finally separated by the switching mechanism 12, which then reaches the end of the opening movement.

Such operation may advantageously be obtained with specific switching mechanisms, such as toggle switching mechanisms, such as those described above, in which the relative movement of the parts of the mechanism is configured to cause an angular offset between the rotation of the control lever 14 and the actual opening of the contacts 10 to occur, for example in order to briefly delay the separation of the contacts 10 when tripped on opening.

This offset makes it possible to compensate for a decrease in play when the electrical contacts sink because of gradual wear of the electrical contacts throughout the lifetime of the device 2.

In practice, in these embodiments, the control circuit 24 utilizes this offset so that the switching of the power switches (caused by the start of the rotation of the control lever 14, as detected by the sensor 34) anticipates the separation of the electrical contacts 10.

By virtue of the invention, during the opening phase, the electronic control circuit 32 and the sensor 34 make it possible to synchronize the action of the power switches 22 and of the switching mechanism 12, notably in order to order the switching of the power switches 22 to their off state before the electrical contacts 10 are separated. This prevents the occurrence of an electric arc between the electrical contacts 10, and thus makes it possible to interrupt the current safely.

In other words, the delay between the switching of the power switches and the separation of the electrical contacts which results from the design of the switching mechanism 12 is used here.

This is particularly useful when the device is used in a direct-current installation, because the separable electrical contacts 10 are generally not sufficient on their own to interrupt the current.

In contrast, once in the open position, the separable electrical contacts 10 make it possible to create an air gap and prevent electric current from flowing again between the terminals 6 and 8 after the device 2 has been tripped.

In order to close the contacts 10 again (that is to say, to switch the device 2 back to the closed state), the control lever 14 is moved to the corresponding position by a user. This movement, via the link rod 54, drives the hook 56 to rotate and become hooked on the trip bar 58. The link rod 54 then drives the deck 53 to rotate until the contacts 10 close.

Moreover, use of a housing 4 which is analogous or similar, or even identical, to the housings of electromechanical protection devices makes it possible to ensure compatibility with earlier product ranges. For example, the device 2 may be mounted in a distribution board as a replacement for an earlier-generation protection device without it being necessary to modify the whole of the rest of the installation. This also makes it possible to use already-existing auxiliary devices.

It is advantageous to use an optical sensor 34 because such a sensor is small in size and may be easily integrated into the device 2, this making it possible to produce a compact device 2. An optical sensor also has the advantage of being precise and of not being sensitive to surrounding electromagnetic interference (and of not being the origin of electromagnetic interference which could impair the operation of the installation or of the device 2 itself either).

Lastly, using a toggle mechanism as switching mechanism 12 makes it possible to recover play when the contacts sink before the open position of the contacts is reached, as explained above.

Figure 7:
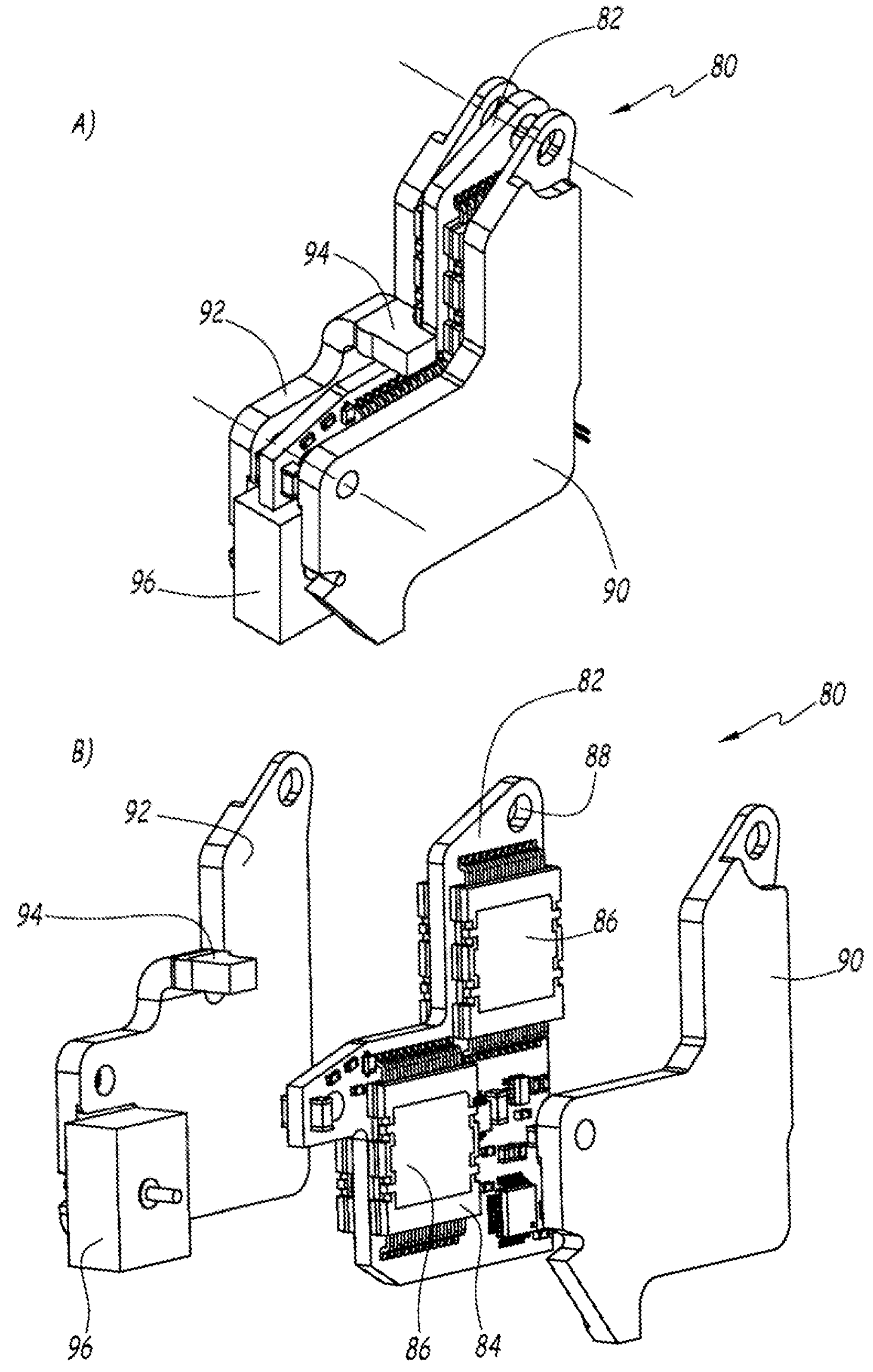
FIG. 7 is a schematic representation, seen in perspective (insert A) and exploded (insert B), of one particular embodiment of one portion of the protection device of FIG. 1.

FIG. 7 shows an advantageous but non-mandatory example of the construction of the electronic breaking module 16.

In this example, at least one portion of the electronic breaking module 16 is constructed in the form of an integrated block 80, or even of several such integrated blocks 80.

Preferably, the or each integrated block 80 comprises the power switches 22 associated with one pole of the device (i.e. with one of said electrical conduction lines, which is itself associated with one electrical phase of the device 2).

The integrated module 80 comprises a plate-shaped substrate 82, for example made of an electrically insulating material.

In practice, it may be a composite material, such as glass-fiber-reinforced epoxy resin, commonly referred to as "FR4".

At least some of the power switches 22 are mounted on the substrate 82, notably on main faces of the substrate 82.

For example, the transistors T1 and T2, which are associated with the first connection line, are mounted on opposite faces of the substrate 82, as may be seen in insert B) of FIG. 7, these switches here bearing the reference number 84.

Specifically, as explained above, each transistor T1, T2 illustrated in FIG. 2 may in practice be implemented by a group of two transistors connected in parallel, notably depending on the rating of the device 2 and on the properties of the transistors used.

In the illustrated example, which is given for the purposes of illustration, the group of two transistors connected in parallel is used to implement the "transistor T1", these two transistors being mounted on a first face of the substrate 82. A group of two other transistors connected in parallel is used to implement the "transistor T2", these two other transistors being mounted on a second face of the substrate 82, the second face of the substrate 82 being opposite the first face of the substrate 82.

Still in this example, the transistors T3, T4 associated with the second connection line are mounted on opposite faces of the substrate 82 of a second integrated block 80, this second integrated block 80 being connected in parallel with the present integrated block 80 and being identical or at least similar to the present integrated block 80.

This second block 80 is, for example, mounted beside the first block 80.

Preferably, the or each integrated block 80 is accommodated in said dedicated compartment of the housing 4 mentioned above.

In practice, each power switch 22 may comprise a heat dissipation plate 86, also called a backing, which surmounts the body of the power switch 22. In other words, the heat dissipation plate 86 is thermally connected to the body of said power switch.

For example, the heat dissipation plate 86 is a metal plate natively fastened to the ceramic body of the power switch 22 by the manufacturer of the power switch 22.

Optionally, components of the electronic control circuit 24 may also be mounted on one or both main faces of the substrate 82.

For example, one or more of the current sensors 30 associated with a connection line may be integrated into the corresponding module 80 and mounted on the substrate 82.

The block 80 also comprises two electrically conductive plates 90 and 92, each plate 90, 92 being mounted on each face of the substrate 82 so as to cover this substrate 82. It is understood that, in the assembled position, the plates 90 and 92 also cover the components mounted on the faces of the substrate 82.

In this description, the plates 90 and 92 are made of metal and are called "metal plates" below. However, as a variant, other materials or material compositions may be used provided that the plates 90 and 92 are electrically conductive.

Advantageously, each metal plate 90, 92 is in contact (preferably in direct contact) with the metal backing 86 of the corresponding power switches (i.e., of the power switches 84 placed under this metal plate 90, 92). In other words, each metal plate 90, 92 is electrically and thermally connected to the corresponding power switches 84.

This arrangement makes it possible to use the plates 90 and 92 both as a heat sink and as an electrically conductive element making it possible to connect the power switches 22.

Specifically, when the power switch 22 is a MOSFET, the metal backing 86 is connected to the drain. Thus, the backing 86 may have the power current which flows through the connection line of the device 2 passing through it. The metal plates 90 and 92 are then connected to the terminal 8 and to the terminal 6 of the corresponding connection line, respectively.

Using the backing 86 to conduct the power current does not cause a risk to the safety of users, since the backing 86 is electrically insulated from the outside by the housing 4 of the device, which is made of an electrically insulating material and which prevents a user from touching the backing 86.

The thermal energy released by the switches 22 is here dissipated to outside the device 2 through conduction along the electrical conductors.

For example, the thermal energy is mainly dissipated through conduction and through radiation by the conductive parts to outside the device 2.

Advantageously, heat dissipation effects due to air convection may also be used, on the condition that ventilation orifices which are compatible with the electrical insulation criteria, such as ventilation vents or slits, are provided.

In order to dissipate the thermal energy through conduction, the whole of the chain through which current passes inside the circuit breaker is involved, that is to say all of the electrical conductors, electrical power supply cables and electrical conduction lines which make it possible for current to flow from upstream to downstream of the device 2.

For example, by construction, the connection lands of the circuit breaker are compatible with the maximum temperature of the insulators of the cables, this temperature possibly reaching, for example, a maximum of 90° C. at the connection lands connected to copper cables equipped with PVC cladding.

In practice, since the hottest point is generally in the center of the device 2, a temperature profile is observed which decreases from the center of the device 2 toward the connection lands for the cables.

Advantageously, the metal plates 90 and 92 are made mainly of copper, which has good electrical and thermal conduction properties.

As a variant, however, other materials having good electricity- and heat-conducting properties may be used, such as aluminum.

It is also possible to use, to construct the metal plates 90 and 92, materials which have undergone a surface treatment, such as a tin-plated plate, or a plate partially or completely covered with a thin silver layer, in order to improve certain properties such as the contact resistance between the power switches and the metal plates. The surface treatment may also improve radiative dissipation, such as, for example, applying paint or carrying out an anodization.

Preferably, the metal plates 90 and 92 are oversized with the aim of increasing the dissipation of thermal energy, mainly through conduction but also through radiation and convection. This oversizing also contributes to decreasing Joule heating.

Also preferably, in the assembled configuration, the (or each) metal plates 90 and 92 extend parallel to the widest walls of the housing 4. In the illustrated example, these are the side walls of the housing 4 of the device 2, these walls being oriented vertically when the device 2 is mounted in an electrical cabinet or a distribution board. Preferably, each metal plate 90, 92 covers at least 40% of the surface area of the corresponding face of the side wall of the housing 4.

The thickness of each of the plates 90 and 92 is preferably less than or equal to 5 mm and, even more preferably, between 1 mm and 3 mm.

In particular, the greater the thickness of the plates 90 and 92, the greater the thermal conduction, this making heat removal more efficient.

By way of illustrative example, in the case of a module 80 comprising four transistors (two transistors connected in parallel on each face of the substrate 82), each transistor dissipating a thermal power of 1 watt, in the case of a one-pole device with a current rating of 16 amperes, it has been possible to note that a thickness of 1.0 mm of copper for the plates 90 and 92 makes it possible to obtain an internal temperature of 114.6° C., while a thickness of 3 mm of copper for the plates 90 and 92 makes it possible to decrease the internal temperature to 105° C.

In practice, the substrate 82 may comprise fastening orifices 88 which, in the assembled configuration, are aligned with corresponding orifices drilled in the metal plates 90 and 92.

In the illustrated example, one of the metal plates (in this instance the metal plate 92) comprises a folded segment 94 folded with respect to the rest of the metal plate 92, for example extending perpendicular to the plane of said metal plate from an edge of said metal plate. Notably, the segment 94 is folded at 90 degrees with respect to the metal plate in order to be oriented toward the pivoting of the mobile electrical contact and thus form a fixed contact segment.

The folded segment 94 is here used as a fixed electrical contact which interacts with the mobile contact 10 to together form said separable electrical contacts, as illustrated in FIG. 1, and thus perform the function of galvanic isolation when the contacts are open.

As a variant, the segment 94 could be replaced by a contact segment taking a different form. For example, the contact segment could be formed directly on an edge or edge face of the metal plate, without there being a folded protrusion.

As a variant, the folded segment 94 may be omitted. The contact segment may also be omitted, notably when the plates 90 and 92 and more generally the block 80 are placed in a housing which is separate from the housing comprising the mobile electrical contact, as, for example, in the case mentioned above where the power switches are housed in a housing which is separate from the housing comprising the switching mechanism. This makes it possible, for example, to employ a board and metal plates of larger areas.

The metal plates 90 and 92 are here brought into contact via an overvoltage-limiting element 96, which corresponds to an element 26 for protecting against overvoltages described with reference to FIG. 2.

The overvoltage-limiting element 96 is electrically connected to the metal plates 90 and 92, for example by means of tin-based welding. However, as a variant, other soldering or assembly techniques may be employed. For example, the element 96 is pressed into direct contact with the metal plates 90 and 92 by screwing.

In certain variants, when the protection element 26 is omitted, the element 96 may be replaced by an electrical conductor.

However, as a variant, the block 80 may be constructed differently.

For example, in the case of a direct-current (DC) device with one-way current flow, it is possible to use only a single power switch. In this case, it is possible to use only one face of the substrate 82 and to use only a single metal plate 90 or 92 covering this face of the substrate, this plate being connected between the terminals 6 and 8. Preferably, this single plate is mounted on the side of the substrate 82 which is opposite the mobile electrical contact 10.

The embodiments relating to the block 80 and notably to the plates 90 and 92 may be implemented independently of the preceding embodiments, and notably of the embodiments relating to the ways in which the switches 22 are controlled and to the operation of the sensor 34.

The block 80 may be constructed with other types of power switches, for example IGBTs, SiC MOSFETS, GaN MOSFETs as well as SiC JFETs, these examples not being limiting.

Generally, embodiments relating to the block 80 may concern an electrical protection device 2 comprising a housing 4, connection terminals 6, 8, separable electrical contacts 10 connected between the connection terminals 6, 8, a switching mechanism 12 and at least one power switch 22 which is connected in series with the separable electrical contacts.

The separable electrical contacts 10 can move between an open state and a closed state, the switching mechanism 12 comprises a control lever 14 and is coupled with the separable electrical contacts 10 in order to switch the separable electrical contacts to the open state, and the electrical protection device further comprises an electronic control circuit 24 coupled with said at least one power switch 22.

The electrical protection device 2 further comprises at least one power switch, or even a pair of power switches, such as field-effect transistors T1, T2, and preferably MOSFETs, each power switch comprising a metal backing 86 connected to the drain (or more generally to an electrode) of said power switch.

Said metal backing 86 is thermally connected to the body of said power switch, and the power switches are connected in series with separable electrical contacts (which are capable of forming an air gap) between the connection terminals 6, 8 via metal plates 90, 92 connected (electrically and thermally) to the metal backings 86 of the respective power switches.

Other embodiments of the device 2 are nevertheless possible.

In particular, the device 2 may be modified to be used in a single-phase installation, or in a polyphase installation, as explained above.

Figure 8:
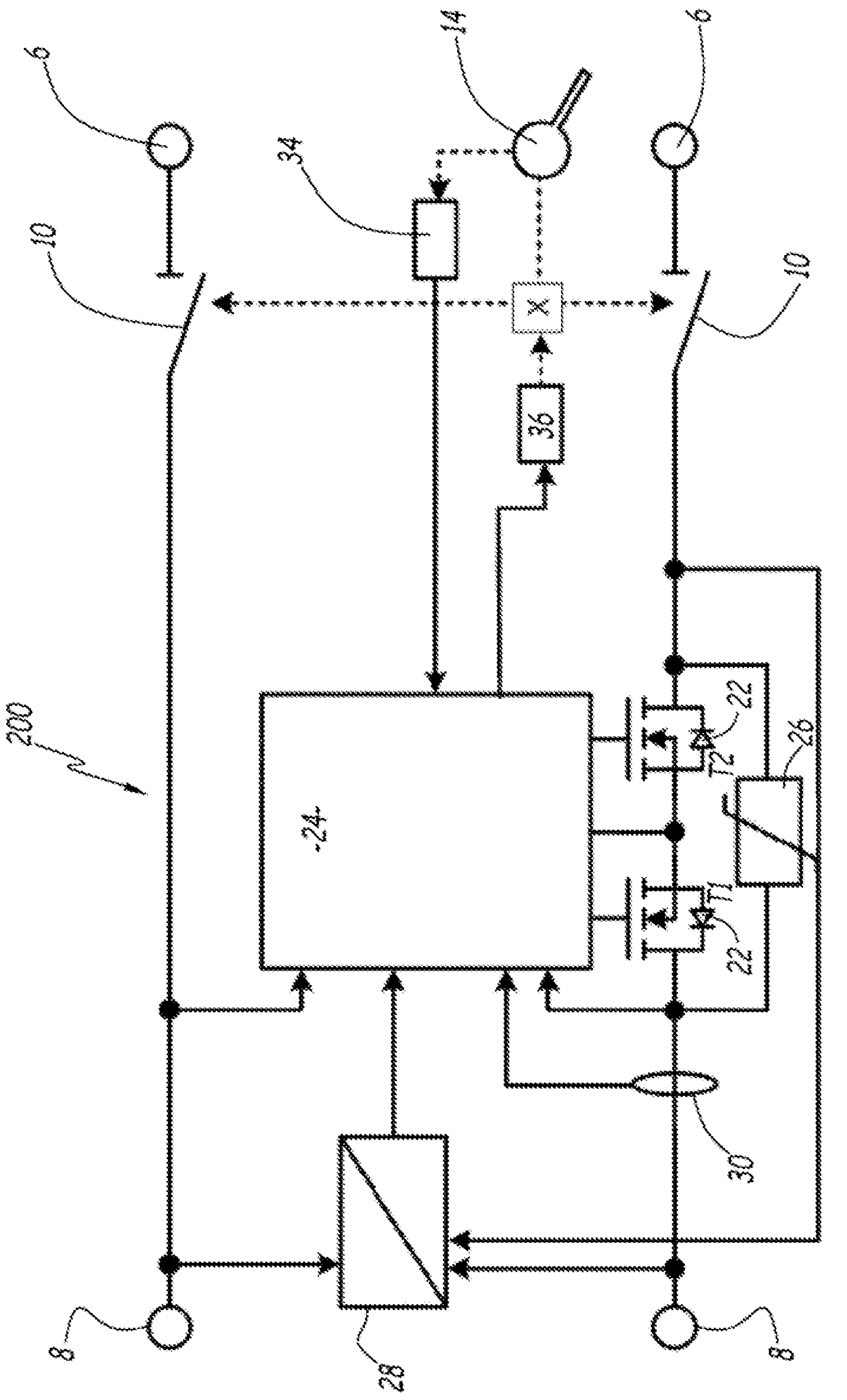
FIG. 8 is a functional diagram of the electrical protection device of FIG. 1 according to a first variant, in which the device is a single-phase device.

FIG. 8 shows one embodiment of a single-phase device 200.

The device 200 is similar to the device 2 described with reference to FIG. 2, except that one of the connection lines is replaced by a neutral conductive line which is devoid of power switches T3 and T4 (and of the protection component 26).

Apart from these differences, those elements of the device 200 which are analogous to the corresponding elements of the device 2 bear the same reference signs and are not described in detail, insofar as the above description may be transposed to them.

For the sake of readability, certain optional elements of the device 2, such as the auxiliary power supply 38, are not shown in FIG. 8, although they could be optionally feature in this embodiment.

Figure 9:
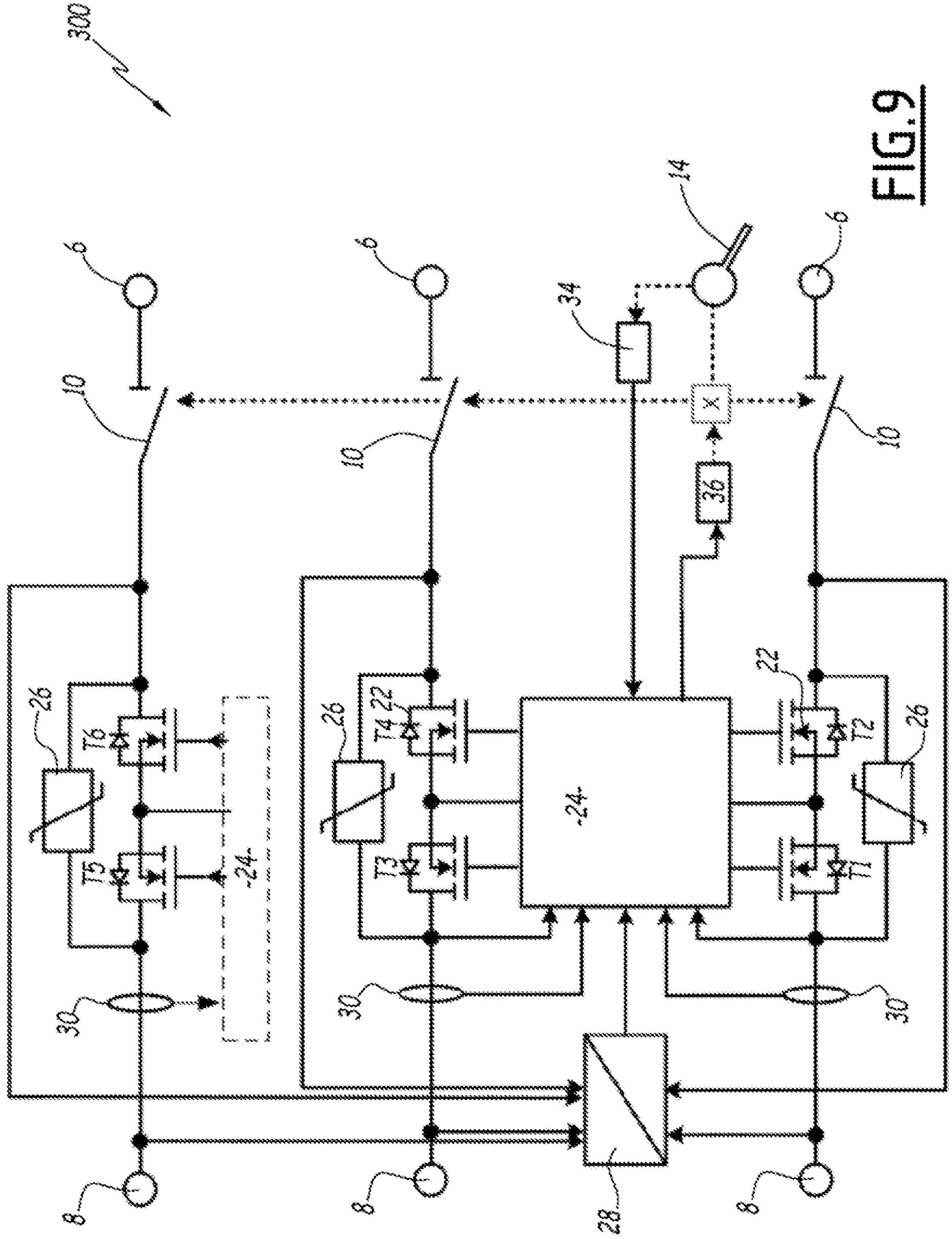
FIG. 9 is a functional diagram of the electrical protection device of FIG. 1 according to a second variant, in which the device is a three-phase device.

FIG. 9 shows one embodiment of a three-phase device 300.

The device 300 is similar to the device 2 described with reference to FIG. 2, except that the device 300 comprises a third connection line connected in parallel with the first connection line and with the second connection line between the terminals 6 and 8.

The third electrical connection line is similar or identical to the first connection line and to the second connection line and comprises at least one of said power switches 22 (here two in number and labeled T5 and T6) and an electrical contact 10 such as described above, which is connected in series with the one or more power switches 22 by one or more electrical conductors.

Advantageously, the third connection line comprises an element 26 for protecting against overvoltages, which is connected in parallel with the power switches 22, as described above.

Once again, for the sake of readability, certain optional elements of the device 2, such as the auxiliary power supply 38, are not shown in FIG. 9, although they could optionally feature in this embodiment.

Figure 10:
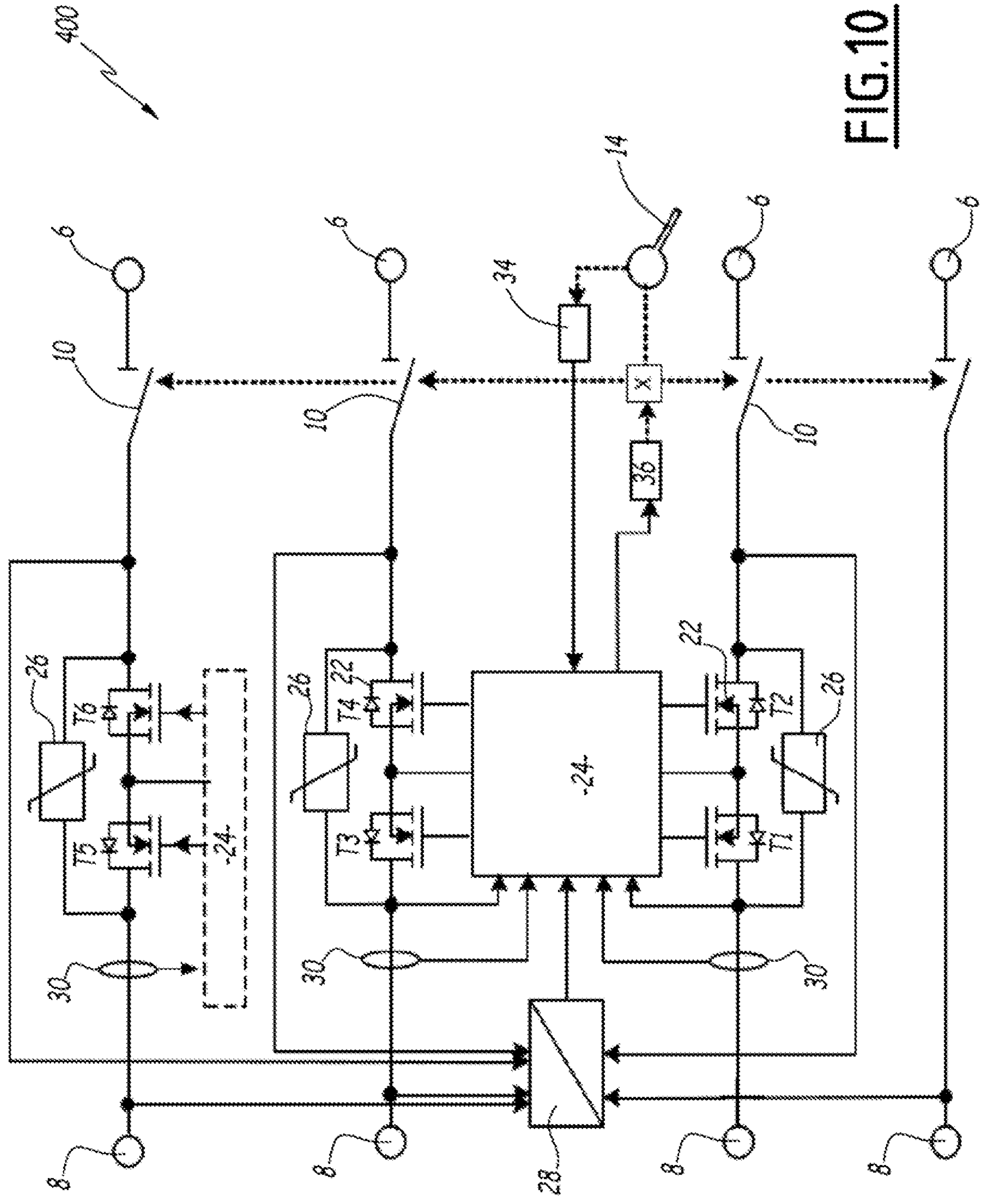
FIG. 10 is a functional diagram of the electrical protection device of FIG. 1 according to a third variant, in which the device is a three-phase device with a neutral line.

FIG. 10 shows one embodiment of a three-phase (three-pole) device 400 with a neutral, comprising three electrical connection lines and a neutral line which is similar to the neutral line of the device 200.

The device 400 is similar to the device 300 described with reference to FIG. 9, except that the device 400 comprises, in addition, a neutral line connected in parallel with the first connection line and with the second connection line between the terminals 6 and 8.

Apart from these differences, those elements of the device 400 which are analogous to the corresponding elements of the device 300 bear the same reference signs and are not described in detail, insofar as the above description may be transposed to them.

Figure 11:
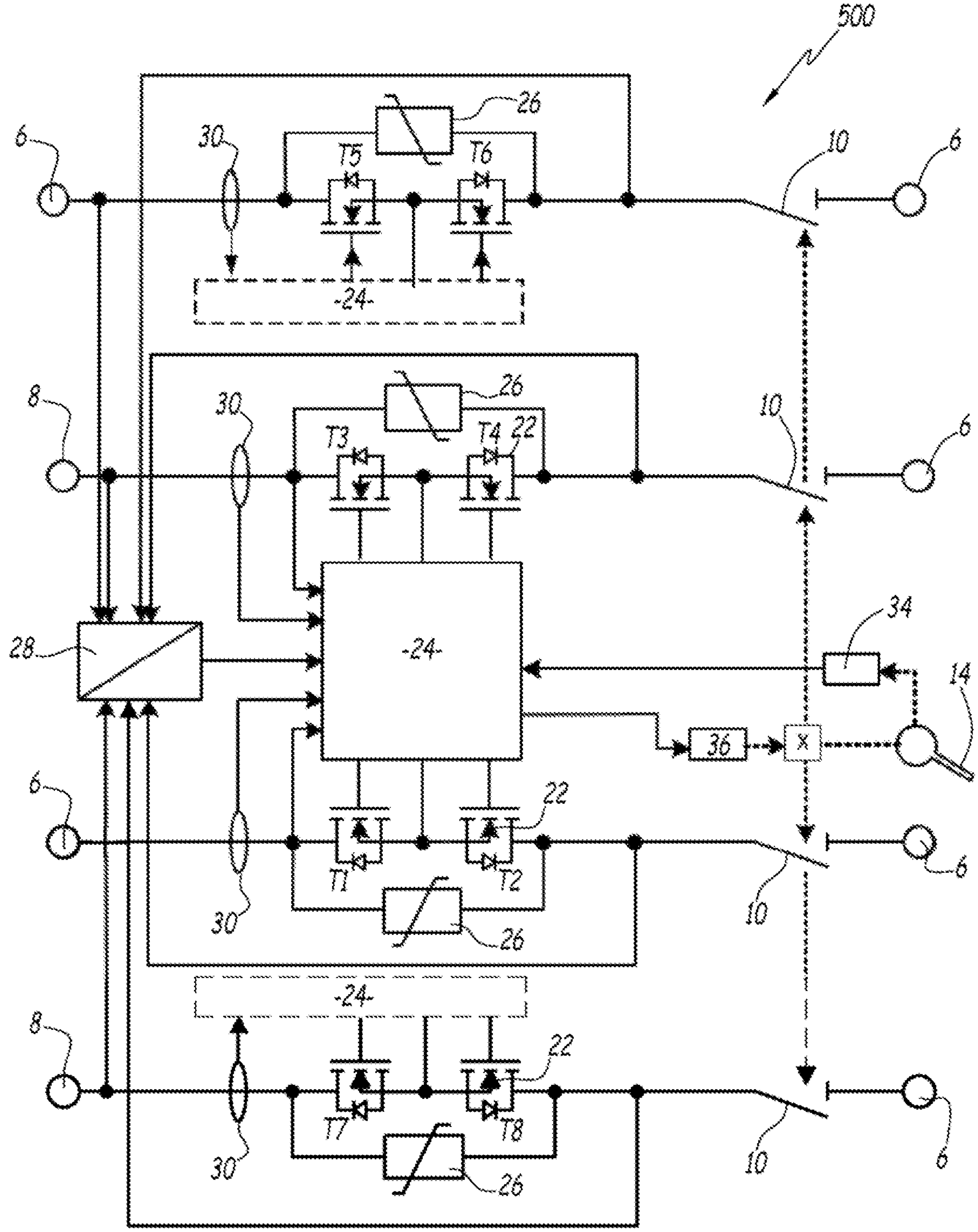
FIG. 11 is a functional diagram of the electrical protection device of FIG. 1 according to a fourth variant, in which the device is a four-pole device.

FIG. 11 shows one embodiment of a four-phase (four-pole) device 500 comprising four electrical connection lines which are similar to the connection lines described above.

The device 500 is similar to the device 4 described with reference to FIG. 10, except that the device 500 comprises, instead of the neutral line, a fourth connection line connected in parallel with the first connection line and with the second connection line between the terminals 6 and 8.

The fourth electrical connection line is similar or identical to the first connection line and to the second connection line and comprises at least one of said power switches 22 (here two in number and labeled T7 and T8) and an electrical contact 10 such as described above, which is connected in series with the one or more power switches 22 by one or more electrical conductors.

Advantageously, the fourth connection line comprises an element 26 for protecting against overvoltages, which is connected in parallel with the power switches 22, as described above.

Apart from these differences, those elements of the device 500 which are analogous to the corresponding elements of the device 400 bear the same reference signs and are not described in detail, insofar as the above description may be transposed to them.

Once again, in both these cases, for the sake of readability, certain optional elements, such as the auxiliary power supply 38, are not shown in FIGS. 10 and 11, although they could be optionally feature in these embodiments.

The embodiments and the variants envisaged above may be combined with one another to create new embodiments.

The invention claimed is:

1. An electrical protection system comprising:

a housing, connection terminals, separable electrical contacts connected between the connection terminals, a switching mechanism, and at least one power switch, which is connected in series with the separable electrical contacts, the separable electrical contacts being able to move between an open state and a closed state, the switching mechanism being coupled with the separable electrical contacts in order to switch the separable electrical contacts to the open state, the electrical protection system further comprising:

an electronic control circuit coupled with the at least one power switch, the at least one power switch comprising a heat dissipation plate made of metal connected to an electrode of the at least one power switch, the heat dissipation plate being thermally connected to a body of the at least one power switch, and wherein the at least one power switch is connected in series with the separable electrical contacts between the connection terminals via a conductive plate connected to the heat dissipation plate of the at least one power switch.

2. The system as claimed in claim 1, wherein the respective conductive plate covers at least 40% of a surface area of a corresponding face of a side wall of the housing.

3. The system as claimed in claim 1, wherein the respective conductive plate extends parallel to at least one widest wall of the housing.

4. The system as claimed in claim 1, wherein the body of the at least one power switch is a ceramic body, and the heat dissipation plate is a metal plate natively fastened to the ceramic body of the at least one power switch.

5. The system as claimed in claim 1, wherein the at least one power switch is a field-effect transistor, the field-effect transistor comprising a MOSFET.

6. The system as claimed in claim 1, wherein at least one of the respective conductive plates comprises a segment which is suitable for forming an electrical contact, the segment being used as a fixed electrical contact which interacts with a mobile contact of the system to together form said separable electrical contacts.

7. The system as claimed in claim 1, wherein the respective conductive plate is connected to a respective connection terminal of the system.

8. The system as claimed in claim 1, wherein the housing is a first housing and an electrical protection device comprises a second housing and the electrical protection system, wherein the electrical protection device is an air circuit breaker.

9. The system as claimed in claim 1, wherein the respective conductive plate comprises metal.

10. The system as claimed in claim 9, wherein the metal comprises copper or aluminum.

11. The system as claimed in claim 1, wherein an electrical protection device comprises the electrical protection system, wherein the electrical protection device is a miniature circuit breaker.

12. The system as claimed in claim 1, further comprising:

an optical sensor configured to detect an on or off state of the switching mechanism, wherein the electronic control circuit is configured to turn off the at least one power switch in response to the optical sensor detecting the switching mechanism is in the off state.

13. The system as claimed in claim 12, wherein the optical sensor is an obstruction-based optical sensor.

14. The system as claimed in claim 1, wherein the at least one power switch associated with a pole of the system is mounted on a plate-shaped substrate integrated into a block, the respective conductive plate of each power switch being mounted on the same side of the substrate of the block.

15. The system as claimed in claim 14, wherein the system comprises two groups of the at least one power switch which are associated with the same pole of the system which are mounted on the substrate, each of the at least one power switch and the respective conductive plate of said group being mounted on opposite sides of the substrate.

16. The system as claimed in claim 14, wherein the block is accommodated in a dedicated compartment of the housing.

17. A circuit breaker, comprising:

a housing;

a plurality of connection terminals;

a plurality of separable electrical contacts connected between the plurality of connection terminals; and at least one power switch connected in series with the plurality of separable electrical contacts, the at least one power switch comprising:

a body;

an electrode; and a heat dissipation plate thermally connected to the body and the electrode, wherein the at least one power switch is connected in series with the plurality of separable electrical contacts via a conductive plate connected to the heat dissipation plate of the at least one power switch.

18. The circuit breaker as claimed in claim 17, wherein the heat dissipation plate comprises metal.

19. The system as claimed in claim 11, wherein a width of the housing is a multiple of 9 millimeters.

* * * * *